(12) United States Patent
Schinabeck et al.

(10) Patent No.: US 10,486,455 B2
(45) Date of Patent: Nov. 26, 2019

(54) APPLICATION DEVICE

(71) Applicant: GIESECKE+DEVRIENT CURRENCY TECHNOLOGY GMBH, München (DE)

(72) Inventors: Josef Schinabeck, Garmisch-Partenkirchen (DE); André Gregarek, München (DE); Winfried Hoffmüller, Bad Tölz (DE); Christoph Gebauer, München (DE); Christoph Mengel, Holzkirchen (DE); Mario Keller, Seebruck (DE); Matthias Pfeiffer, München (DE)

(73) Assignee: GIESECKE+DEVRIENT CURRENCY TECHNOLOGY GMBH, Munich (DE)

(*) Notice: Subject to any disclaimer, the term of this patent is extended or adjusted under 35 U.S.C. 154(b) by 0 days.

(21) Appl. No.: 15/577,024

(22) PCT Filed: May 19, 2016

(86) PCT No.: PCT/EP2016/000837
§ 371 (c)(1),
(2) Date: Nov. 27, 2017

(87) PCT Pub. No.: WO2016/188624
PCT Pub. Date: Dec. 1, 2016

(65) Prior Publication Data
US 2018/0141370 A1    May 24, 2018

(30) Foreign Application Priority Data

May 27, 2015    (DE) .................. 10 2015 006 854

(51) Int. Cl.
*B42D 25/465*    (2014.01)
*B42D 25/29*    (2014.01)
(Continued)

(52) U.S. Cl.
CPC ........... *B42D 25/465* (2014.10); *B42D 25/23* (2014.10); *B42D 25/29* (2014.10); *B42D 25/30* (2014.10); *B32B 37/187* (2013.01)

(58) Field of Classification Search
USPC ........................................ 156/540, 541, 556
See application file for complete search history.

(56) References Cited

U.S. PATENT DOCUMENTS

| 5,207,855 A | 5/1993 | Nyfeler et al. |
| 2004/0178625 A1* | 9/2004 | Siegfried ............... B32B 37/182 283/74 |

(Continued)

FOREIGN PATENT DOCUMENTS

| EP | 1457320 A1 | 9/2004 |
| EP | 2860042 A1 | 4/2015 |

OTHER PUBLICATIONS

International Search Report from PCT Application No. PCT/EP2016/000837, dated Aug. 11, 2016.

(Continued)

*Primary Examiner* — Sing P Chan
(74) *Attorney, Agent, or Firm* — Workman Nydegger (57) ABSTRACT

An apparatus for applying security elements, comprises at least one value document substrate transport device for transporting a value document substrate web, at least one security elements transport device for transporting a security elements carrier band having a plurality of security elements, wherein the security elements carrier band has a first and a second main surface which oppose each other, each security element has a first and a second main surface which oppose each other, each security element is arranged with its first main surface on the first main surface of the security elements carrier band, and each security element has adhesive properties at its second main surface, wherein the apparatus has an application region in order to apply the (Continued)

security elements with their second main surface onto the value document substrate web. A security elements carrier band and a value document involve the apparatus.

7 Claims, 3 Drawing Sheets

(51) Int. Cl.
    *B42D 25/23*     (2014.01)
    *B42D 25/30*     (2014.01)
    *B42D 25/47*     (2014.01)
    *B32B 37/00*     (2006.01)

(56) References Cited

U.S. PATENT DOCUMENTS

2005/0225079 A1* 10/2005 Woontner ............. G09F 3/0292
                                                                                                                      283/110
2008/0026192 A1* 1/2008 Halliday ................. G09F 3/10
                                                                                                                      428/204

OTHER PUBLICATIONS

Transmittal of Third Party Observations to Applicant from EP Application No. 16724289, dated Apr. 9, 2019.
Information about Non-Relevance of Third-Party Observations from EP Application No. 16724289, dated Apr. 10, 2019.
Decision to Grant a European Patent from EP Application No. 16724289, dated Jun. 14, 2019.

* cited by examiner

APPLICATION DEVICE

BACKGROUND

The invention relates to an apparatus for applying security elements, a security elements carrier band, a method for applying security elements.

Value documents as intended by the invention are, inter alia, bank notes, shares, bonds, deeds, vouchers, checks, air tickets, high-value admission tickets, labels for product authentication, credit cards or cash cards, but also other documents at risk of forgery, such as passports, identification cards or other identity documents.

Value documents, in particular bank notes, are usually produced from paper substrates, polymer substrates or combinations of paper and polymer which have particular security features, such as a security thread at least partly incorporated into the paper or a watermark. As further security features, so-called window foils, security threads, security bands can be bonded/laminated to the value document or incorporated therein. Security elements usually comprise a polymer or polymer compositions as a carrier material or base material. Typically, security elements have optically variable security features such as holograms or certain color-shift effects to thereby guarantee better anti-forgery security. The particular advantage of optically variable security elements is that the security features on said security elements cannot be imitated by mere copying using a copying machine, since effects of an optically variable security feature are lost or even only appear black through copying.

There already exist apparatuses for applying elements. For illustrating these apparatuses, reference is made to FIG. 6 which illustrates the present situation according to the prior art.

SUMMARY

It is an object of the present invention to supply an apparatus which makes it possible to apply security elements onto value document substrates with lower time expenditures and at lower costs.

A first aspect of the invention relates to an apparatus for applying security elements, comprising
  at least one value document substrate transport device for transporting a value document substrate web,
  at least one security elements transport device for transporting a security elements carrier band having a plurality of security elements, wherein
    the security elements carrier band has a first and a second main surface which oppose each other,
    each security element has a first and a second main surface which oppose each other,
    each security element is arranged with its first main surface on/at the first main surface of the security elements carrier band, and each security element has adhesive properties at its second main surface, wherein
  the apparatus has an application region in order to apply the security elements with their second main surface onto the value document substrate web.

Advantageously, by the present apparatus having the application region in which the security elements are applied with their second main surface onto the value document substrate web, it can be achieved that the security elements in spite of a narrower arrangement on the security elements carrier band can be transferred reliably and with high process speeds onto the value document substrate web.

Further advantageously, the material usage required for the security elements carrier band can be decreased by the present apparatus.

The value document substrate transport device is preferably designed as a roll-to-roll device. In an initial state the value document substrate web is wound on a roll or cylinder. Alternatively, the value document substrate web is present as an endless substrate. The value document substrate web is transported through the application region by means of one or several conveyor rolls of the value document substrate transport device. In so doing, a value document substrate web, which in its initial state is wound on a roll, is unwound/unrolled.

Preferably, after passing the application region, the value document substrate web is again wound onto a roll or a cylinder. Further preferably, after the application region the value document substrate web can be fed to one or several further processing region(s) before the value document substrate web is wound onto a roll or a cylinder or is made up into sheets.

Preferably, before the application region there can be arranged one or several processing regions.

The security elements transport device is preferably designed as a roll-to-roll device. In an initial state the security elements carrier band is wound on a roll or cylinder. Alternatively, the security elements carrier band is present as an endless band. By means of one or several conveyor rolls of the security elements transport device the security elements carrier band is transported through the application region. In so doing, a security elements carrier band which in the initial state is wound on a roll is unwound/unrolled.

Preferably, after passing the application region the security elements carrier band without security elements is again wound onto a roll or a cylinder.

The adhesive properties of the security elements at the second main surface thereof can be achieved, for example, by an adherent layer or adhesive layer laid on the security elements. In particular, a heat-sealing adhesive can be used as an adhesive.

Preferably, the adhesive forces or the adhesiveness which act or acts between the first main surface of the security elements carrier band and the first main surface of the security elements are lower than the adhesive forces or the adhesiveness which act between the second main surface of the security elements and the value document substrate web.

In the application region the security elements are transferred from the security elements carrier band onto the value document substrate. In the application region the security element is detached from the security elements carrier band and—in particular simultaneously—laid onto the value document substrate.

The security elements are preferably of a multi-layer design. Preferably, a security element comprises a carrier material, such as a foil element and/or one or several lacquer layers and/or one or several adhesive layers and/or one or several metal layers and/or one or several semi-metal layers and/or dielectric layers.

The security element can comprise a foil element which leads to self-supporting properties of the security element. This security element is also referred to as self-supporting security element, in particular L-LEAD or L-patch.

The security element can be configured without foil element leading to self-supporting properties of the security element. This security element is also referred to as a non-self-supporting security element, in particular as a T-LEAD or T-patch.

Preferably, the value document substrate web and the security elements carrier band have substantially the same transport direction in the application region.

Particularly preferably, the value document substrate web and the security elements carrier band have the same transport direction in the region in which the transfer/the applying of the security elements onto the value document substrate web takes place.

Preferably, the apparatus transports the security elements carrier band and the value document substrate web in a roll-to-roll method through the application region.

Preferably, the value document substrate web in the application region has a speed of between 40 m/min. and 150 m/min. Preferably, the speed of the security elements carrier band in the application region is lower than that of the value document substrate web.

Preferably, the apparatus has an application device in the application region. Preferably, the application device comprises one or several application rolls or one or several transfer rolls. Preferably, the application device comprises one or several application wedges. The application wedge (or the application roll) are in particular arranged for detaching the security elements from the security elements carrier band and for laying these onto the value document substrate. Further preferably, the application device has one or several calender rolls or rollers. Preferably, an application wedge is arranged next to a calender roll. Preferably, the application wedge is heated. Preferably, the calender roll is heated.

Preferably, the heated application wedge serves to activate an adhesive of the security elements and thus promoting an adherence to the value document substrate web. Subsequently, the security elements can be finally fixed onto value document substrate web with the help of the heated calender roll. The calender roll/roller can have a width which corresponds to the width of the value document substrate web. Alternatively, the calender roll/roller can have a width which corresponds to the width of a security element.

Preferably, the application device has a width, i.e. in the direction transverse to the transport direction of the security elements carrier band, in the region of 20 mm to 1500 mm.

Advantageously, the apparatus has a counterpressure device in the application region, which supplies a counterpressure opposing the application device, in particular opposing the application roll and/or the calender roll. The counterpressure device is preferably a counterpressure roll/counterpressure cylinder.

Advantageously, this decreases or avoids additional action of force onto the value document substrate web and/or the security elements carrier band.

Further preferably, the application region is arranged between a feeding region and a removing region of the security elements carrier band.

Further preferably, the security elements carrier band surrounds the circumference of the application device by 40% or more or by at least 40%. Preferably, the application device is heatable. Preferably, the application device is designed to heat the security elements carrier band. Preferably, the security elements carrier band surrounds the circumference of the application device in such a way that a heat transfer from a heated application device to a security elements carrier band is possible. Further preferably, a heating device for heating the security elements carrier band in the application region can be provided, in order to activate the adhesive properties of the security elements at the second main surface thereof and to thereby promoting an adherence of the security elements to the value document substrate web upon application.

Further preferably, the apparatus has an application angle $\gamma$. The application angle $\gamma$ is preferably in a region of 5° to 40° and/or 5° to 30° and/or 5° to 25° and/or 5° to 20° and/or 5° to 15° and/or 5° to 10° and/or 8° to 20° and/or 8° to 15°.

Further preferably, in the removing region the security elements carrier band and the value document substrate web enclose an angle $\beta$.

Preferably, the apparatus comprises at least one processing region which is arranged before the application region. Preferably, a processing region is a cutting region and/or a punching region. Preferably, in a cutting region and/or a punching region the value document substrate web can be processed. For example, so-called windows or holes of different forms can be introduced into the value document substrate web. Preferably, these windows or holes are later closed by the application of security elements.

Preferably, the following statements regarding the security elements carrier band, the method for application as well as the value document apply analogously also to the above-described apparatus.

A further aspect relates to a security elements carrier band having a plurality of security elements, wherein
the security elements carrier band has a first and a second main surface which oppose each other,
each security element has a first and a second main surface which oppose each other,
each security element is arranged with its first main surface at the first main surface of the security elements carrier band, and
the second main surface of each security element has adhesive properties for application to the value document substrate web.

Preferably, the security elements are fixed onto the value document substrate web on account of the adhesive properties.

Preferably, the security elements carrier band comprises a carrier foil as a carrier band material. Particularly preferably, the carrier material includes polyethylene terephthalate (PET) and/or polypropylene (PP), the carrier material made of PET or PP is particularly preferred.

Preferably, the security elements have a distance of 5 mm to 80 mm in the direction of the transport direction of the security elements carrier band.

Preferably, the security elements have a distance of 5 mm to 200 mm in the direction transverse to the transport direction of the security elements carrier band.

Preferably, the security elements carrier band has adhesive properties on its first main surface.

Advantageously, during the transport in the above-described apparatus the security elements thus adhere to the security elements carrier band at the first main surface of the security elements carrier band until reaching the application region. However, the adhesive properties are adjusted such that in the application region the security elements are detachable from the first main surface of the security elements carrier band in order to be applied onto the value document substrate web.

Preferably, the security elements carrier band has discrete regions on its first main surface which have the adhesive properties, and these discrete regions are covered by security elements.

Advantageously, the adhesive properties are thus present only in the regions which are covered by the security elements.

Preferably, these discrete regions are smaller than the first main surface of each security element, so that respectively the first main surface of the security elements is connected partially, via the discrete regions, with the security elements carrier band.

Preferably, the first main surface of each security element has no self-adhesive properties.

Advantageously, the adhesive properties between the security elements and the security elements carrier band are adjusted in such a way that the security elements are (easily) detachable from the security elements carrier band.

Preferably, the second main surface of the security elements carrier band has non-stick properties.

Preferably, the second main surface of the security elements carrier band has a non-stick coating, such as a wax layer, for non-stick properties.

Alternatively or additionally, a separating band is arranged at the second main surface of the security elements carrier band.

Preferably, the separating band is provided when the security elements carrier band is rolled up on a roll/cylinder for preventing a connection of the second main surface of the security elements with the second main surface of the security elements carrier band.

Preferably, the security elements are patches and/or (LEAD) strips. Preferably, the patches can be configured as L-patches and/or T-patches. Preferably, the (LEAD) strips can be configured as L-LEAD and/or T-LEAD. A security strip (or thread) is provided for extending over the entire width (or length) of a substrate, for example, of the value document. A patch as a security element is smaller in its length and width, normally substantially smaller, than the substrate (for example of the value document) for which the patch is provided.

Preferably, the security elements have a length in the direction of the transport direction of the security elements carrier band of 5 mm to 70 mm. Preferably, the security elements have a width of 5 mm to 40 mm, preferably 5 mm to 20 mm in the direction transverse to the transport direction of the security elements carrier band.

Preferably, the security elements have security features which are configured as relief structures, such as holograms, microlenses, micromirrors, moth-eye structures, microcavities. Alternatively or additionally, the security elements have security features which are configured as two- or multi-layer thin-film structures/elements, such as they are used for color-shift effects. Alternatively or additionally, the security elements have security features, which are configured as printed patterns, where UV-fluorescent and/or magnetically alignable effect pigments can be contained. Alternatively or additionally, the security elements have security features, which are configured as negative characters and/or negative patterns. Preferably, the security features are designed in such a way that they are visible in plan view and/or in transmission view.

Preferably, the statements with respect to the apparatus and the following statements regarding the method for applying as well as to the value document apply to the above-described security elements carrier band analogously.

A further aspect relates to a method for applying security elements, comprising supplying at least one value document substrate transport device which transports a value document substrate web, supplying at least one security elements transport device which transports a security elements carrier band having a plurality of security elements, wherein the security elements carrier band has a first and a second main surface which oppose each other, each security element has a first and a second main surface which oppose each other, each security element is arranged with its first main surface on/at the first main surface of the security elements carrier band, and each security element has adhesive properties/adhesive layer at its second main surface, applying the security elements onto the value document substrate web in such a way that the security elements are fixed with their second main surface onto the value document substrate web.

Preferably, the statements with respect to the apparatus and the following statements regarding the method for applying hold for the above-described security elements carrier band analogously.

In the step of applying, the security element is detached from the security elements carrier band and preferably simultaneously laid onto the value document substrate.

A security element according to this invention can contain in particular a foil or a multi-layer substrate, wherein the multilayer substrate can also have a combination of fabric substrates and foils. For example, the security element can comprise a window region which serves to fill, or bridge, a hole in a value document or in the paper substrate of the value document. In other words, with the security element there can be incorporated a security window in a value document or laid thereon. Preferably, the region to be coated is arranged in the window region of the security element. Alternatively, the security element can be laid onto a value document, for example laminated or bonded thereto. The security element can be a security thread or security band, windowed thread, patch or the like.

A further aspect relates to a value document, in particular a bank note, having a value-document substrate and at least one security element which has been manufactured by means of one or a plurality of the previously described method steps and/or from the described aspects.

A security element is laid preferably onto a value document substrate web, and a value document substrate web is made up into value document substrate sheets and then into value document substrate copies. Value document substrate serves as a basis for a value document substrate web. Value document substrate can be manufactured from natural polymer, such as cotton, synthetic polymer, such as polypropylene or a combination of natural and synthetic polymer, which is also referred to as a paper polymer combination.

The upper side and underside of the value document as well as those of the security element can also be referred to as main surfaces. Said main surfaces render relevant information to a viewer. Consequently, the main surfaces are visible to a viewer viewing a value document having a security element. For example, a main surface of a bank note can render the value of the bank note as well as its serial number. Accordingly, an upper side and underside of a security element, like those of a value document, can also be regarded as first and second main surfaces.

Preferably, the statements with respect to the value document hold analogously for the previously described apparatus, for the previously described security elements carrier band as well as for the previously described method for applying.

BRIEF DESCRIPTION OF THE DRAWINGS

The invention will be explained hereinafter on the basis of preferred embodiments in connection with the attached figures, whose representation does without a true-to-proportion and true-to-scale rendition in order to increase the illustrative value.

There are shown.

DETAILED DESCRIPTION OF VARIOUS EMBODIMENTS

Figure 1A:
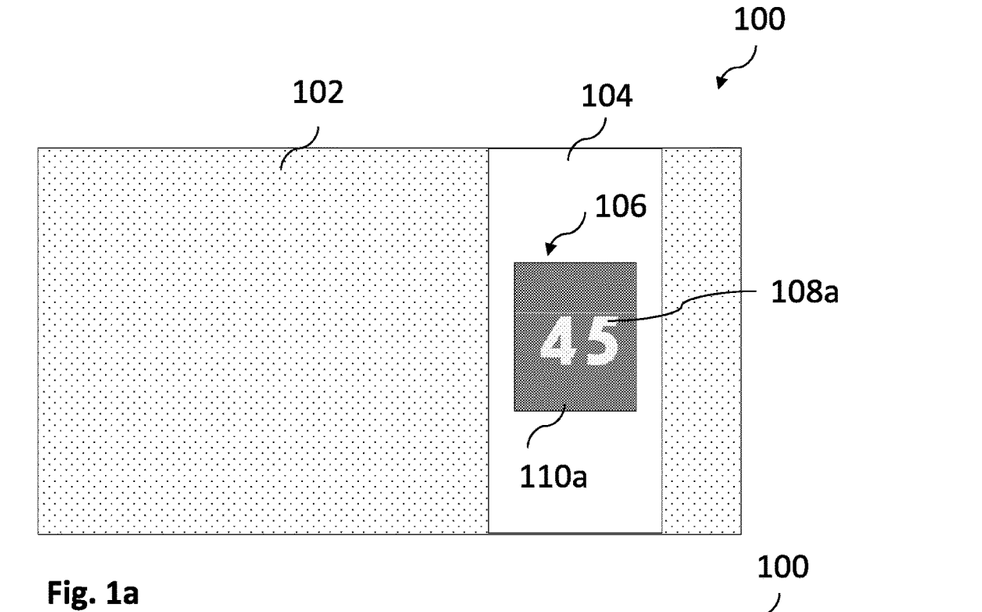
FIG. 1a, 1b a schematic representation of a value document having a security element.
Figure 1B:
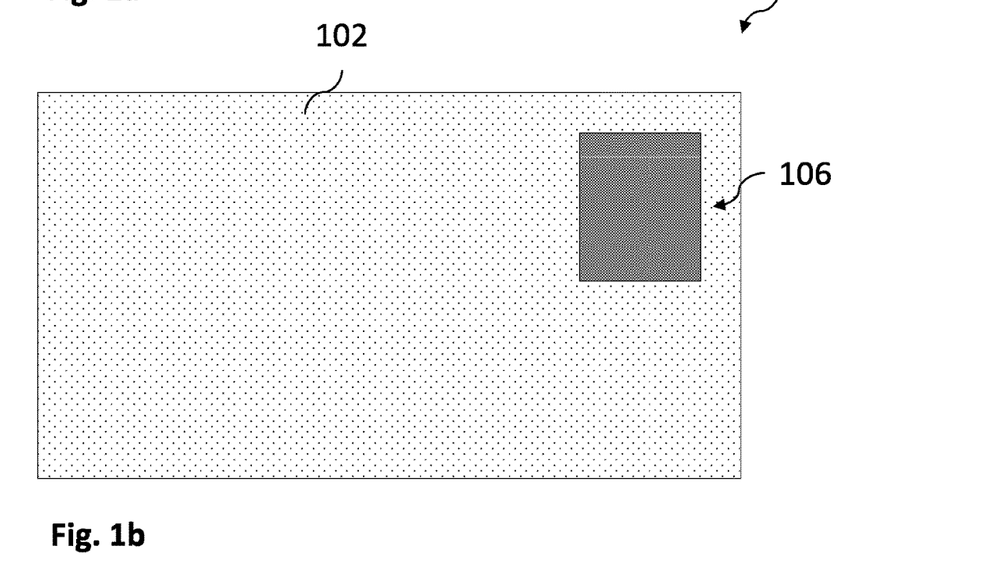

FIGS. 1a and 1b respectively show a schematic plan view of a main surface of a value document 100 with a value document substrate 102 and a security element 104, the security element 104 being firmly connected with the value document substrate 102. The security element 104 is laid on the value document substrate with its second main surface. The security element 104 was applied on the value document substrate 102 with the apparatus according to the invention or with the method according to the invention. The value document substrate 102 comes from a value document substrate web, as shown e.g. in FIG. 2 with reference sign 202.

The security element 104 has a region 106 having security features which comprises a negative-pattern region 108a and a color-shift or thin-film element region 110a. Furthermore, a negative-pattern region could have any shape or design. Preferably, a negative-pattern region enables a viewer to recognize the negative-pattern region in plan view and/or in transmission view. Further preferably, the negative-pattern region can have a different color appearance in plan view compared to transmission view (so-called transmission-view color effects).

FIG. 1a shows the number 45 as a negative-pattern region 108a. Furthermore, the security element 104 in FIG. 1a is configured as a so-called LEAD strip. This LEAD strip can be configured as a T-LEAD or as an L-LEAD. In FIG. 1b, the negative-pattern region has three strips not represented here. Furthermore, the security element 104 in FIG. 1b is configured as a so-called patch. This patch can be configured as a T-patch or as an L-patch.

According to an embodiment, in the value document substrate 102 according to FIG. 1a or 1b in the region 106 there can be provided a window or hole which is covered or closed by the security element 104.

A strip, and likewise a patch, can further have any shape (outside contour) or design (layer construction).

If the security element 104 is configured as an L-LEAD or as an L-patch, it contains preferably a carrier material. The carrier material is made preferably of polyethylene terephthalate (PET).

Figure 2:
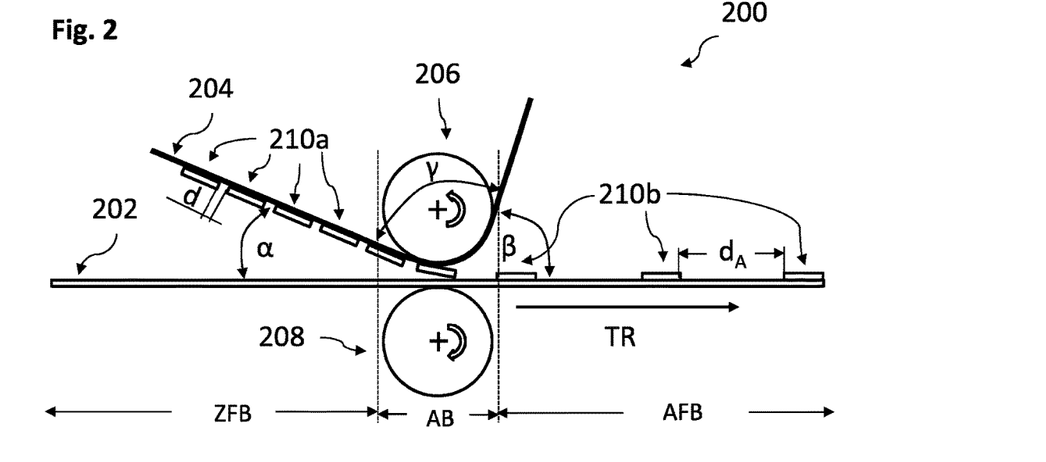
FIG. 2 a schematic representation of a detail of an apparatus for applying security elements according to a variant.

FIG. 2 shows a schematic representation of a detail of an apparatus 200 for applying security elements 210 onto a value document substrate web 202. The value document substrate web 202 is transported from a feeding region ZFB into an application region AB and then into a removing region AFB. The transport of the value document substrate web 202 is effected in the transport direction TR. In the application region AB security elements 210a arranged on a security elements carrier band 204 are transferred or applied onto the value document substrate web 202. The security elements 210b applied on the value document substrate web 202 are then firmly connected with the value document substrate web 202 or fixed thereon. For saving material, the security elements 210, as long as they are arranged on the security elements carrier band 204, are lined up one behind the other with a smaller distance d (see security elements 210a) than after applying on the value document substrate web 202. After applying the security elements have a greater distance $d_A$ from each other (see security elements 210b).

Preferably, by applying the security elements there is changed only the distance in the transport direction, while the distance transverse to the transport direction may remain the same. In particular, the distance $d_A$ is greater than the distance d.

In the application region AB there is provided an application device 206 which supports the applying/transferring of the security elements 210 onto the value document substrate web 202. The application device 206 is an application roll. Preferably, a counterpressure device 208 can be provided in the application region AB to support the transfer of the security elements 210 onto the value document substrate web 202, on the one hand, and to reduce the mechanical loads on the value document substrate web 202 caused by the application roll 206, on the other hand.

In the feeding region ZFB the value document substrate web 202 and the security elements carrier band 204 enclose an angle α. In the removing region AFB the value document substrate web 202 and the security elements carrier band 204 enclose an angle β.

The apparatus 200 has an application angle γ. The application angle γ is preferably in a region of 5° to 40° and/or 5° to 30° and/or 5° to 25° and/or 5° to 20° and/or 5° to 15° and/or 5° to 10° and/or 8° to 20° and/or 8° to 15°.

According to the example of FIG. 2, the application angle γ is determined in particular by the size or the diameter of the application roll 206 and by the angles α and β.

Figure 3:
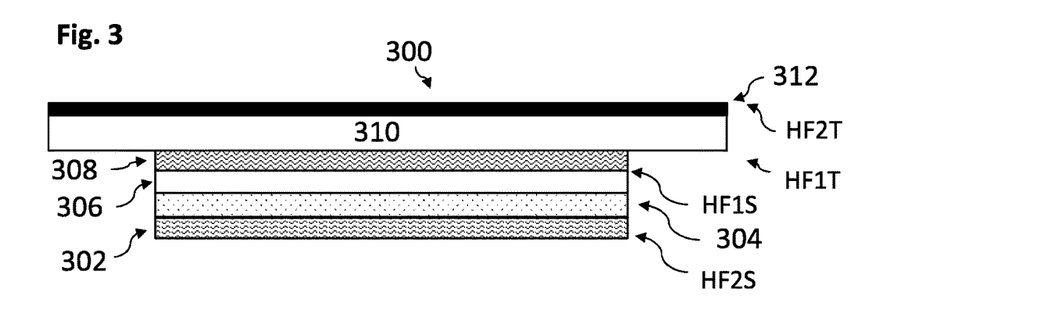
FIG. 3 a schematic sectional representation of a detail of a security elements carrier band having a security element.

FIG. 3 shows a schematic sectional representation of a detail 300 of a security elements carrier band with a security element. The security elements carrier band comprises a carrier material or carrier band material 310. The security elements carrier band has a first main surface HF1T and a second main surface HF2T. Preferably, the first main surface HF1T has adhesive properties. Preferably, the adhesive properties are supplied by at least one layer 308. Preferably, the layer 308 is an adhesive layer 308 which is laid on the carrier band material 310. The second main surface HF2T may have non-stick properties. Preferably, the carrier band material 310 can have a non-stick layer 312 laid thereon, like a wax layer. On the first main surface HF1T of the security elements carrier band there is arranged a security element which comprises, for example, the layers 302, 304 and 306. The security element has a first main surface HF1S and a second main surface HF2S. The security element is arranged with its first main surface HF1S at the security elements carrier band or fixed thereon.

The security element has adhesive properties at its second main surface HF2S, so that the security element with its second main surface HF2S can be fixed at a value document substrate web or applied thereon. Preferably, the security element has a layer 302 which is configured as an adhesive layer to fix the security element at a value document substrate web. The adhesive layer can be a heat-sealing adhesive layer. At its first main surface HF1S the security element preferably has no self-adhesive properties. The security element according to one embodiment may comprise a carrier material, so that the security element has self-supporting properties. Such a carrier material can be, for example, a carrier foil. The layer 306 or 304 can be configured as a carrier foil. The security element can further include one or several decorative layers such as lacquer and/or metal layers and/or printed layers which may also correspond to the layers 304 or 306.

As can be recognized in the Figures, between the security elements arranged on the security elements carrier band with a distance from each other there is a free region. In the free region there is no multi-layer structure, at least none of the layers of the security element, such as the layers 304 and 306, and further preferably no complete layer on the security elements carrier band.

If a security element, as represented in FIG. 3, is laid on a value document substrate web, as explained with regard to FIG. 2, and this value document substrate web (202) is made up into individual bank notes, value documents according to FIGS. 1a and 1b can be obtained.

Figure 4:
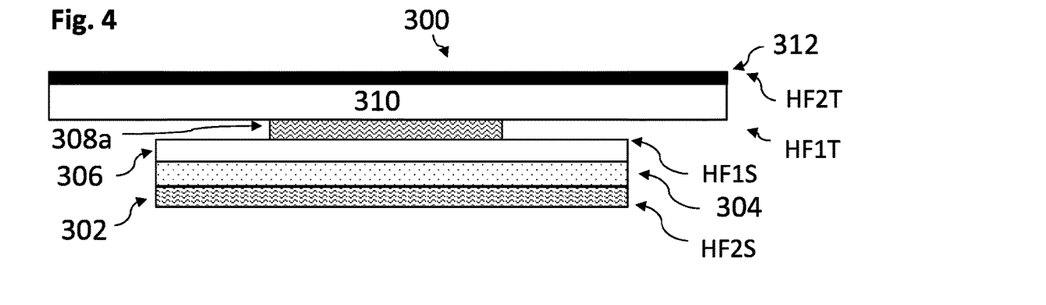
FIG. 4 a schematic sectional representation of a detail of a security elements carrier band having a security element.

FIG. 4 shows a schematic representation of a detail 300 of a security elements carrier band having a security element which substantially corresponds to the objects explained with regard to FIG. 3. The substantial difference between FIG. 3 and FIG. 4 is the layer 308a. According to FIG. 4, the layer 308a is configured as a discrete region, so that the adhesive properties of the security elements carrier band are present only in the region of layer 308a.

Figure 5:
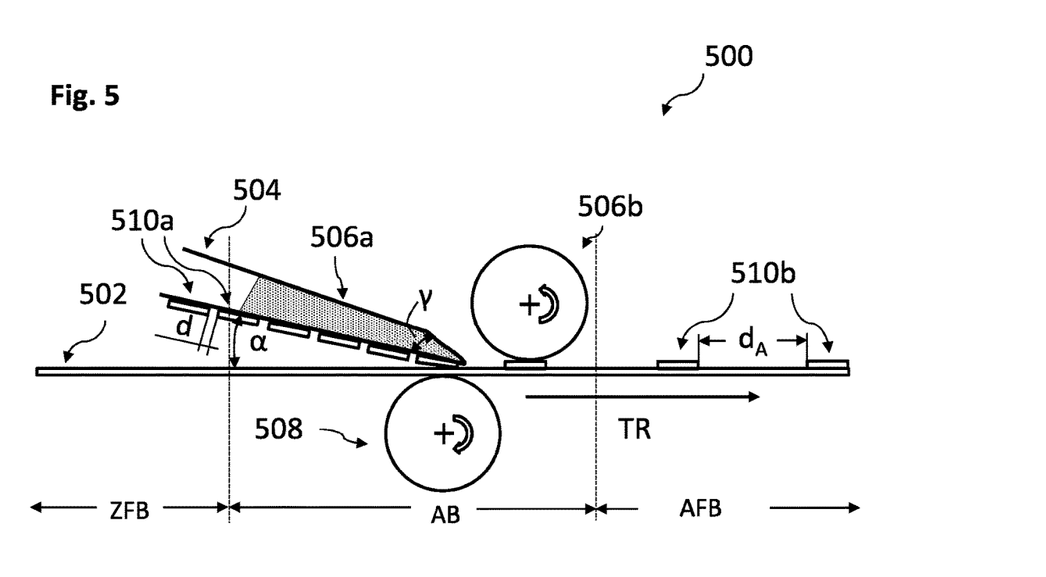
FIG. 5 a schematic representation of a detail of an apparatus for applying security elements according to a further variant.

FIG. 5 shows a schematic representation of a detail of an apparatus 500 for applying security elements 510 onto a value document substrate web 502. The value document substrate web 502 is transported from a feeding region ZFB into an application region AB and then into a removing region AFB. The transport of the value document substrate web 502 is effected in the transport direction TR. In the application region AB security elements 510a arranged on a security elements carrier band 504 are transferred or applied onto the value document substrate web 502. The security elements 510b applied on the value document substrate web 502 are then firmly connected with the value document substrate web 502 or fixed thereon. For saving material, the security elements 510, as long as they are arranged on the security elements carrier band 504, are lined up one behind the other with a smaller distance d (see security elements 510a) than after applying on the value document substrate web 502. After applying the security elements have a greater distance $d_A$ from each other (see security elements 510b).

Preferably, by applying the security elements there is changed only the distance in the transport direction, while the distance transverse to the transport direction may remain the same. In particular, the distance $d_A$ is greater than the distance d.

In the application region AB there is provided an application wedge 506a as well as a calender roll 506b as an application device which supports the applying/transferring of the security elements 510 onto the value document substrate web 502. Preferably, one or several counterpressure devices (not shown) can be provided in the application region AB to support the transfer of the security elements 510 onto the value document substrate web 502, on the one hand, and to reduce the mechanical loads on the value document substrate web 502 caused by the application wedge 506a and/or the calender roll 506b, on the other hand. The calender roll 506b is preferably heated.

In the feeding region ZFB the value document substrate web 502 and the security elements carrier band 504 enclose an angle α.

The apparatus 500 has an application angle γ. Preferably, the application angle γ is adjusted substantially by the application wedge 506a. The application angle γ is preferably in a region of 5° to 40° and/or 5° to 30° and/or 5° to 25° and/or 5° to 20° and/or 5° to 15° and/or 5° to 10° and/or 8° to 20° and/or 8° to 15°.

Figure 6:
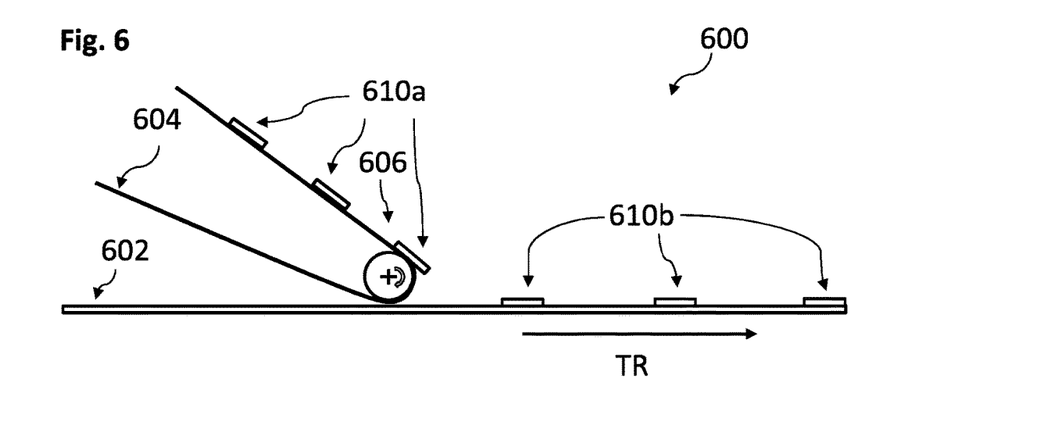
FIG. 6 a schematic representation of a detail of an apparatus according to the prior art.

FIG. 6 shows a schematic representation of a detail 600 of an apparatus according to the prior art. Here, in an application region the transport direction of a web material 602 opposes the transport direction of a transport band 604. The transport band 604 transports the elements 610a which then are laid onto the web material 602 as elements 610d.

LIST OF REFERENCE SIGNS

100 value document
102 value document substrate
104 security element
106 region with security features
108 negative-pattern region
110 thin-film element region
200 detail of the apparatus
204 security elements carrier band
206, 506 application device
208 counterpressure device
210a, 210b, 510a, 510b security elements
302, 304, 306, 308 layer
310 carrier band material
312 non-stick coating
HF1T first main surface of security elements carrier band
HF2T second main surface of security elements carrier band
HF1S first main surface of security element
HF2S second main surface of security element

The invention claimed is:

1. An apparatus for applying security elements, comprising:
   at least one value document substrate transport device for transporting a value document substrate web;
   at least one security elements transport device for transporting a security elements carrier band having a plurality of security elements; wherein
   the security elements carrier band has a first and a second main surface which oppose each other;
   each security element has an upper and a lower main surface which oppose each other;
   each security element is arranged with the upper main surface on the first main surface of the security elements carrier band; and
   each security element has adhesive properties at the lower main surface; wherein
   the apparatus has an application region in which the security elements are detached from the security element carrier band and applied with the lower main surface of the security elements on the value document substrate web;
   wherein the security elements are arranged on the security elements carrier band at a distance (d), and the security elements are arranged on the value document substrate web at a distance (dA) which is greater than the distance (d); and
   wherein a transport direction of the security elements does not change in the application region.

2. The apparatus according to claim 1, wherein the value document substrate web and the security elements carrier band in the application region have the same transport direction and/or the apparatus transports the security elements carrier band and the value document substrate web in a roll-to-roll method through the application region.

3. The apparatus according to claim 1, wherein the apparatus has an application device and counterpressure device, including a counterpressure roll, in the application region.

4. The apparatus according to claim 1, wherein the application region is arranged between a feeding region and a removing region of the security elements carrier band, wherein the apparatus has an application angle $\gamma$ in the range of 5° to 40°.

5. The apparatus according to claim 1, wherein the apparatus comprises at least one processing region, which is arranged before the application region.

6. The apparatus according to claim 1, wherein a speed of the security element carrier band is lower than a speed of the value document substrate web.

7. The apparatus according to claim 1, wherein the security elements carrier band has on the first main surface discrete regions which have adhesive properties, wherein the adhesive properties are present only in regions covered by the security elements and the discrete regions are smaller than the upper main surface of each security element.

* * * * *